United States Patent
Park et al.

(10) Patent No.: US 10,402,975 B2
(45) Date of Patent: Sep. 3, 2019

(54) METHOD AND APPARATUS FOR SEGMENTING MEDICAL IMAGES

(71) Applicant: MEDICALIP CO., LTD., Chuncheon-si, Gangwon-do (KR)

(72) Inventors: Sang Joon Park, Seoul (KR); Doo Hee Lee, Gwangmyeong-si (KR)

(73) Assignee: Medicalip Co., Ltd., Chuncheon-Si, Gangwon-Do (KR)

( * ) Notice: Subject to any disclaimer, the term of this patent is extended or adjusted under 35 U.S.C. 154(b) by 217 days.

(21) Appl. No.: 15/471,996

(22) Filed: Mar. 28, 2017

(65) Prior Publication Data

US 2018/0247407 A1 Aug. 30, 2018

(30) Foreign Application Priority Data

Feb. 28, 2017 (KR) .................. 10-2017-0025866

(51) Int. Cl.
*G06T 7/11* (2017.01)
*G06T 7/162* (2017.01)
*G06T 7/187* (2017.01)

(52) U.S. Cl.
CPC ............. *G06T 7/11* (2017.01); *G06T 7/162* (2017.01); *G06T 7/187* (2017.01); *G06T 2207/10081* (2013.01); *G06T 2207/10088* (2013.01); *G06T 2207/30061* (2013.01); *G06T 2207/30096* (2013.01)

(58) Field of Classification Search
CPC combination set(s) only.
See application file for complete search history.

(56) References Cited

U.S. PATENT DOCUMENTS

| 7,148,887 | B2 | 12/2006 | Kaufman et al. |
| 9,058,514 | B2 | 6/2015 | Kim et al. |
| 9,759,814 | B2 * | 9/2017 | Oh .......................... A61B 6/466 |
| 2007/0217668 | A1 * | 9/2007 | Bornemann ............ G06K 9/00 382/132 |
| 2009/0279758 | A1 * | 11/2009 | Dikici ...................... G06T 7/11 382/128 |

(Continued)

FOREIGN PATENT DOCUMENTS

| KR | 2001-0113840 | 12/2001 |
| KR | 10-2011-0018573 | 2/2011 |

(Continued)

OTHER PUBLICATIONS

World Intellectual Property Organization, International Search Report, dated Nov. 27, 2017, issued in International Application No. PCT/KR2017/002219.

*Primary Examiner* — Kim Y Vu
*Assistant Examiner* — Molly Delaney
(74) *Attorney, Agent, or Firm* — Klarquist Sparkman, LLP (57) ABSTRACT

Provided is a method and apparatus for segmenting medical images. The apparatus sets a first seed group including voxels belonging to a segmentation target region among voxels of a medical image and a second seed group including voxels belonging to a remaining region thereof, assigns a weight to a link between a start node and an end node and a voxel node, and segments the medical image into two regions by cutting a link having a minimum weight in a shortest path in which a sum of weights of a path connecting the start node and the end node is minimum.

8 Claims, 9 Drawing Sheets

(56) References Cited

U.S. PATENT DOCUMENTS

2016/0189373 A1  6/2016 Park et al.
2017/0228868 A1* 8/2017 Song ...................... G06T 7/11

FOREIGN PATENT DOCUMENTS

| KR | 10-2012-0079931 A | 7/2012 |
| KR | 10-2013-0088507   | 8/2013 |
| KR | 10-2014-0048449 A | 4/2014 |
| KR | 10-1482247 B1     | 1/2015 |
| WO | WO 2017/030276 A1 | 2/2017 |

\* cited by examiner

METHOD AND APPARATUS FOR SEGMENTING MEDICAL IMAGES

CROSS-REFERENCE TO RELATED APPLICATION

This application claims the benefit of Korean Patent Application No. 10-2017-0025866, filed on Feb. 28, 2017, in the Korean Intellectual Property Office, the disclosure of which is incorporated herein in its entirety by reference.

BACKGROUND

1. Field

One or more embodiments relate to methods and apparatuses for automatically segmenting regions of various body organs included in three-dimensional (3D) medical images.

2. Description of the Related Art

Three-dimensional (3D) medical images may be acquired through a computed tomography (CT) apparatus, a magnetic resonance imaging (MRI) apparatus, or the like. Treatment and surgery plans may be precisely established by accurately determining the anatomical positions of body organs (e.g., lungs and airways) or lesions (e.g., tumors) in 3D medical images, but it may be very difficult to automatically divide regions of body organs, such as lunglobes divided by gaps of membranes of less than 1 mm or bronchioles of less than 2 mm, in medical images.

SUMMARY

One or more embodiments include methods and apparatuses for accurately segmenting three-dimensional (3D) anatomical positions of body organs in medical images.

Additional aspects will be set forth in part in the description which follows and, in part, will be apparent from the description, or may be learned by practice of the presented embodiments.

According to one or more embodiments, a method of segmenting medical images includes: receiving a medical image; setting a first seed group including voxels belonging to a segmentation target region among voxels of the medical image and a second seed group including voxels belonging to a remaining region thereof; assigning a weight to a link connecting each of a start node and an end node with a voxel node representing each voxel of the medical image, wherein the weight is determined based on a type of a node connected with the voxel node and a type of a seed group to which the voxel node belongs; determining a weight of a link connecting voxel nodes with each other based on at least one of a distance and a signal intensity difference between voxels of the medical image; and repeating a process of determining a link having a minimum weight in a shortest path, in which a sum of weights of a path connecting the start node and the end node is minimum, as a cut link until voxel nodes of the medical image are segmented into two regions by a cut link.

According to one or more embodiments, an apparatus for segmenting medical images includes: an input unit receiving a medical image; a group setting unit setting a first seed group including voxels belonging to a segmentation target region among voxels of the medical image and a second seed group including voxels belonging to a remaining region thereof; a first weight determining unit assigning a weight to a link connecting each of a start node and an end node with a voxel node representing each voxel of the medical image, wherein the weight is determined based on a type of a node connected with the voxel node and a type of a seed group to which the voxel node belongs; a second weight determining unit determining a weight of a link connecting voxel nodes with each other based on at least one of a distance and a signal intensity difference between voxels of the medical image; and a segmenting unit repeating a process of determining a link having a minimum weight in a shortest path, in which a sum of weights of a path connecting the start node and the end node is minimum, as a cut link until voxel nodes of the medical image are segmented into two regions by a cut link.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, methods and apparatuses for segmenting medical images according to the inventive concept will be described in detail with reference to the accompanying drawings.

Figure 1:
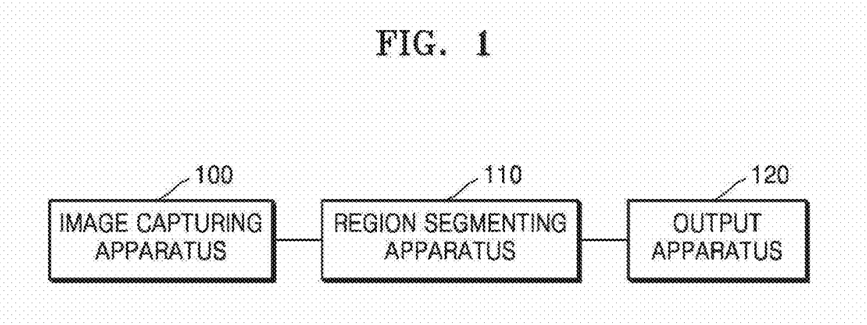
FIG. 1 is a diagram illustrating a simple example of a system for capturing and processing a three-dimensional (3D) human body image according to the inventive concept.

FIG. 1 is a diagram illustrating a simple example of a system for capturing and processing a three-dimensional (3D) human body image according to the inventive concept.

Referring to FIG. 1, the system according to the inventive concept may include an image capturing apparatus 100, a region segmenting apparatus 110, and an output apparatus 120.

The image capturing apparatus 100 may be, for example, an apparatus capturing a 3D image of the inside of a body. The image capturing apparatus 100 may include, for example, but not limited to, a computed tomography (CT) apparatus or a magnetic resonance imaging (MRI) apparatus and may include any apparatus that may acquire a 3D image of the inside of a body.

The region segmenting apparatus 110 may receive a 3D medical image captured by the image capturing apparatus 100 and process the received medical image for various purposes such as extracting a desired region therefrom. In the present embodiment, the region segmenting apparatus 110 is illustrated as directly receiving an image captured by the image capturing apparatus 100; however, the region segmenting apparatus 110 is not limited thereto and may receive a medical image through any electronic medium (e.g., compact disk (CD), digital versatile disk (DVD), or USB memory). The region segmenting apparatus 110 may receive the medical image as a DICOM (Digital Imaging and Communication in Medicine) file.

The output apparatus 120 may include, for example, a monitor and may receive and output an image processed by the region segmenting apparatus 110. The output apparatus 120 may be integrated with the region segmenting apparatus 110 or may be connected with the region segmenting apparatus 110 through a wired/wireless communication network to display an image received remotely from the region segmenting apparatus 110.

Figure 2:
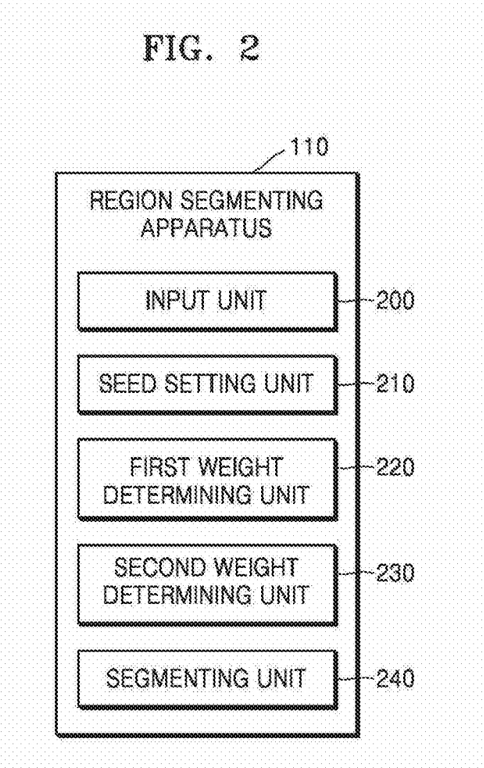
FIG. 2 is a diagram illustrating a configuration of an embodiment of a region segmenting apparatus according to the inventive concept.

FIG. 2 is a diagram illustrating a configuration of an embodiment of a region segmenting apparatus according to the inventive concept.

Referring to FIG. 2, the region segmenting apparatus 110 may include an input unit 200, a seed setting unit 210, a first weight determining unit 220, a second weight determining unit 230, and a segmenting unit 240.

The input unit 200 may receive a 3D medical image. The 3D medical image may include voxels and may represent each tissue as a contrast of signal intensity. For example, in a CT image, the signal intensity of a lung tissue may be about −400 HU (Hounsfield Unit) or less, and the internal signal intensity of an airway containing air may be about −950 HU.

According to an embodiment, the input unit 200 may further perform a preprocessing process on the 3D medical image. Through the preprocessing process, the noise of the medical image may be removed to improve the image quality thereof. The preprocessing process may include various conventional methods. For example, the input unit 200 may perform the preprocessing process by using anisotropic diffusion (AD) filtering. Since the AD filtering is a conventional algorithm that is widely used to effectively remove the noise while preserving a reliable boundary, detailed descriptions thereof will be omitted for conciseness. In an AD filtering process, an iteration number 'i' and a filtering strength 'k' should be determined and may be set, for example, as i=1, k=∞.

The seed setting unit 210 may set a first seed group including a certain number of voxels belonging to a segmentation target region and a second seed group including a certain number of voxels belonging to a remaining region thereof. Since a region of a body organ (e.g., a bronchus, a lunglobe, a hepatic vessel, or a bone) to be segmented in a 3D medical image has a volume, it is different from simply segmenting a region in a two-dimensional (2D) image. For example, since the 3D medical image captured by CT is composed of a plurality of X-Y plane images captured at certain intervals along the Z axis, the segmentation of the 3D medical image corresponds to the segmentation of a volume along the Z axis, not the segmentation of a region in a single X-Y plane image.

Thus, the present embodiment proposes a method of setting a first seed group including one or more voxels selected in a segmentation target region and a second seed group including one or more voxels selected in a remaining region thereof and segmenting the segmentation target region by using the first and second seed groups. In order to improve the region segmentation quality, it may be necessary to accurately set the first seed group and the second seed group.

Figure 3:
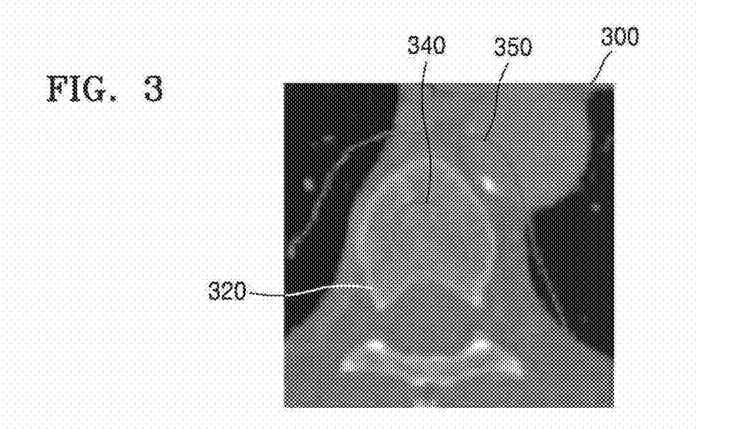
FIGS. 3 to 5 are diagrams illustrating an example of a method of receiving a seed group from a user for medical image segmentation according to the inventive concept.
Figure 4:
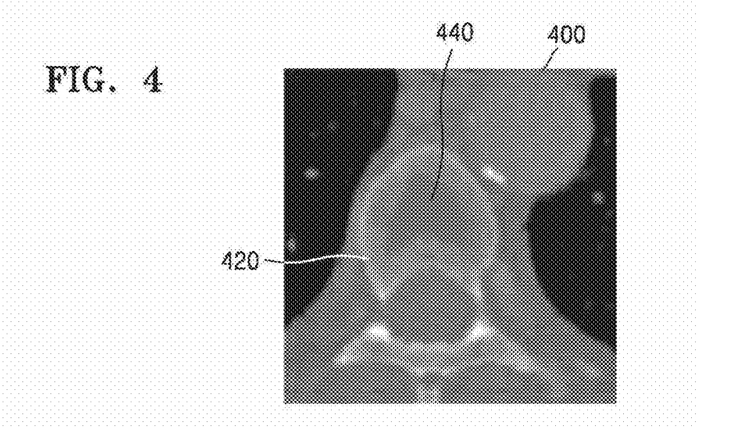
Figure 5:
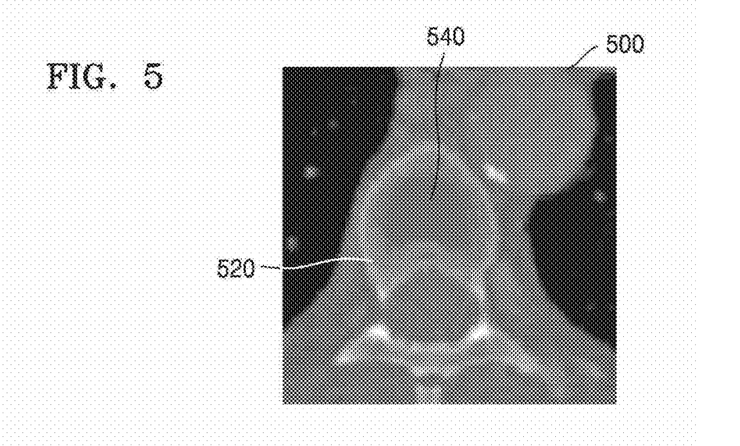
Figure 6:
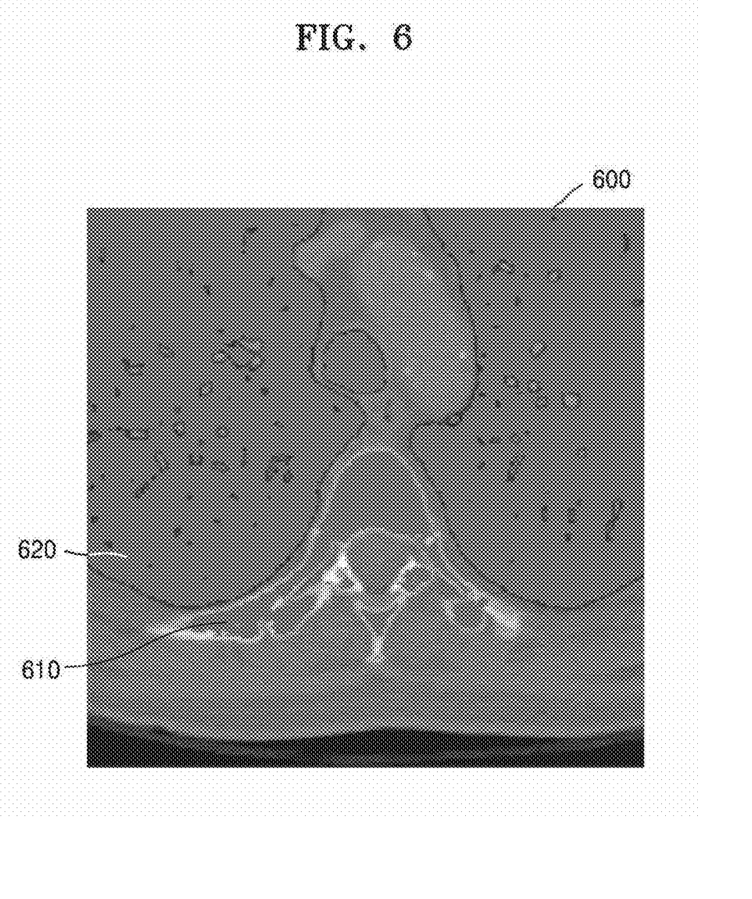
FIG. 6 is a diagram illustrating an example of a method of setting a seed group based on a region growing method for medical image segmentation according to the inventive concept.
Figure 7:
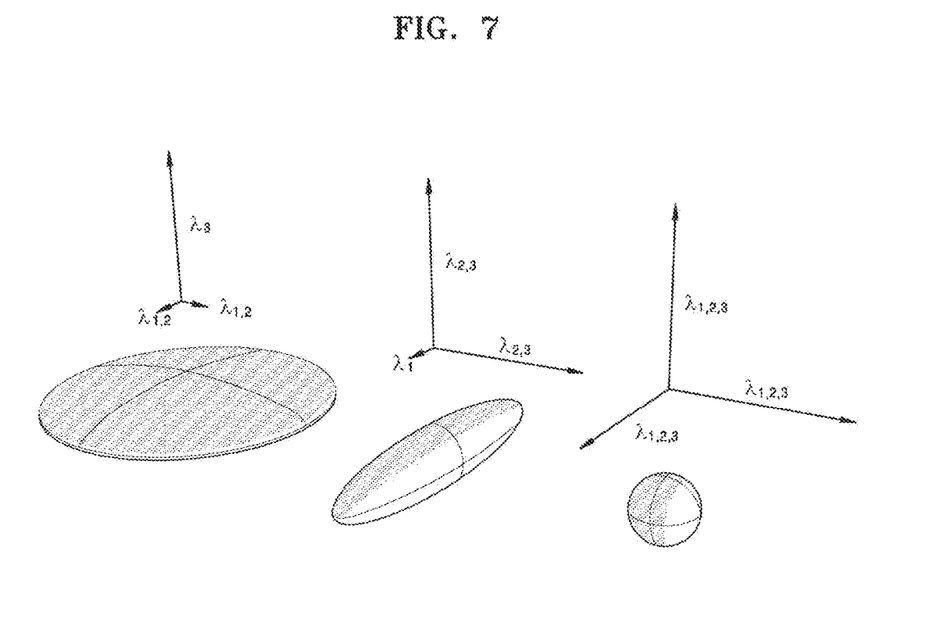
FIG. 7 is a diagram illustrating an example of a method of setting a seed group based on a morphological feature for medical image segmentation according to the inventive concept.

The seed setting unit 210 may receive a selection of the first seed group and the second seed group from a user or may automatically set the first seed group and the second seed group by using a predetermined algorithm. An example of a method of selecting a seed group by the user is illustrated in FIGS. 3 to 5, and an example of a method of automatically setting a seed group through an algorithm is illustrated in FIGS. 6 and 7. A seed setting method will be described in detail with reference to FIGS. 3 to 7.

The first weight determining unit 220 may assign a weight to a link connecting each of a virtual start node and a virtual end node with a voxel node corresponding to each voxel constituting the medical image. Each of the start node and the end node may be connected with the entire voxel node of the medical image by a one-to-one link. For example, referring to FIG. 8, when the medical image includes 27 voxel nodes 830, a start node 810 may be connected to each of the 27 voxel nodes 830 and an end node 820 may also be connected to each of the 27 voxel nodes 830. Hereinafter, for convenience of description, a link 840 connecting the start node 810 and the voxel node 830 with each other will be referred to as a start link and a link 850 connecting the end node 820 and the voxel node 830 with each other will be referred to as an end link.

From the viewpoint of the voxel node, each voxel node may be connected with both the start node and the end node. The first weight determining unit 220 may determine the weight of the start link and the end link based on the type of the node (i.e., the start node or the end node) to which the voxel node is connected and the type of the seed group (i.e., the first seed group or the second seed group) to which the voxel node belongs.

For example, the first weight determining unit 220 may assign a maximum weight to the start link connecting the start node and the voxel node belonging to the first seed group and may assign a minimum weight to the start link connecting the start node and the voxel node belonging to the second seed group. Also, the first weight determining unit 220 may assign a medium weight (between the maximum weight and the minimum weight) to the start link connecting the start node with the remaining voxel node (i.e., the voxel node not belonging to the first seed group or the second seed group).

As another example, the first weight determining unit 220 may assign a minimum weight to the end link connecting the end node and the voxel node belonging to the first seed group, may assign a maximum weight to the end link connecting the end node and the voxel node belonging to the second seed group, and may assign a medium weight (between the maximum weight and the minimum weight) to the end link connecting the end node with the remaining voxel node (i.e., the voxel node not belonging to the first seed group or the second seed group).

The weight setting according to the above example may be summarized as follows.

Start Link between Start Node and Voxel Node of First Seed Group: Maximum Value
Start Link between Start Node and Voxel Node of Second Seed Group: Minimum Value
End Link between End Node and Voxel Node of First Seed Group: Minimum Value
End Link between End Node and Voxel Node of Second Seed Group: Maximum Value
Start Link and End Link between Start Node and End Node and Remaining Voxel Node: Medium Value Herein, the maximum value and the minimum value may be preset based on the end values of the weight range assigned to the link connecting the voxel nodes with each other, which will be described below. When the weight range of the link between the voxel nodes is between 0 and 1, the maximum value and the minimum value of the start link may be predefined as 10 and 0 respectively.

The present embodiment may be characterized in that different weights are assigned to the respective links according to the type of the seed group to which the voxel node belongs and the type of the node connected with the voxel node. And the different weights may be set according to various embodiments. Thus, the inventive concept is not limited to the above example of assigning the maximum value, the minimum value, and the medium value to the start link and the end link.

The second weight determining unit 230 may assign a weight to the link between the voxel nodes. In this case, the second weight determining unit 230 may determine the weight based on the signal intensity difference between the voxel nodes (e.g., the HU value difference represented by the respective voxels). The distances between the respective voxels constituting the 3D medical image may not be uniform. For example, in the case of a CT image, since X-Y plane images are captured at very short intervals along the Z axis, the distance between adjacent voxels in the X-axis and the distance between adjacent voxels in the Z-axis may be different according to the Z-axis image capturing intervals. Thus, according to an embodiment, the second weight determining unit 230 may determine the weight of a voxel link in consideration of both the signal intensity difference and the inter-voxel distance.

Figure 8:
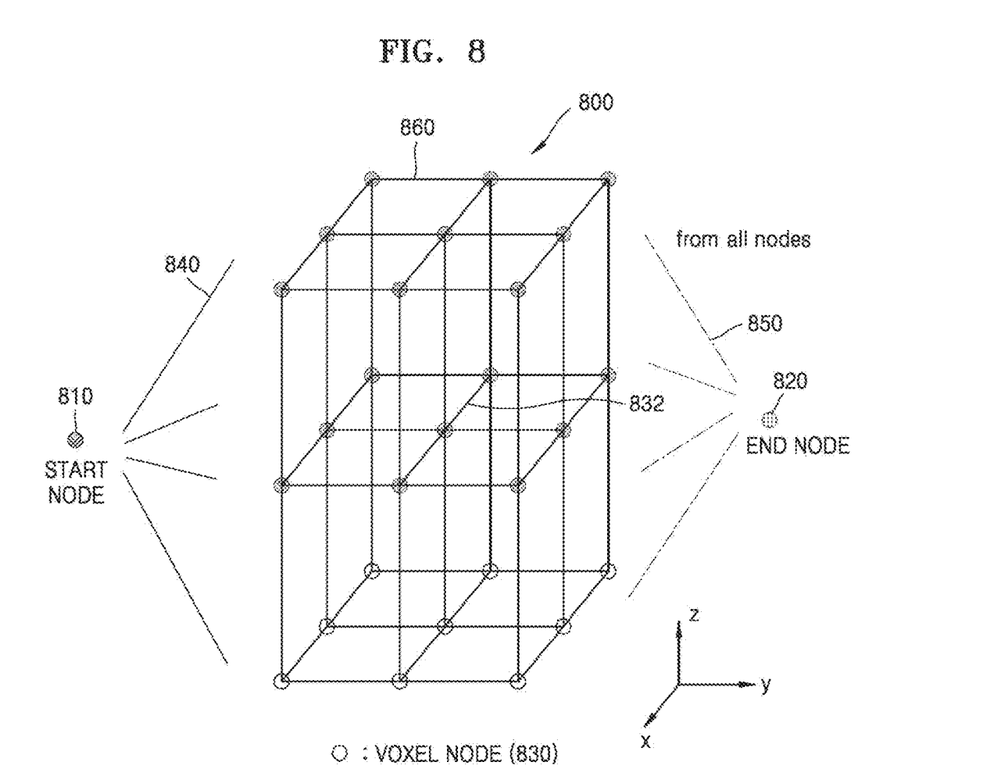
FIG. 8 is a diagram illustrating an example of a node graph for medical image segmentation according to the inventive concept.

As illustrated in FIG. 8, since 26 voxel nodes exist around a voxel node 832 existing in the space (not on the surface), one voxel node in the space may have 26 links 860 with adjacent voxel nodes. Hereinafter, for convenience of description, the link 860 between adjacent voxel nodes will be referred to as a voxel link.

Since the possibility of two voxels not belonging to the same region increases as the signal intensity difference or distance between the two voxels increases, the second weight determining unit 230 may assign the weight of the voxel link as a value of the reciprocal of the product of the signal intensity difference and the distance between the voxels (i.e., Weight=1/(Signal Intensity Difference×Distance)). A method of calculating the weight of the voxel link is not limited thereto, and the weight may be calculated by various methods using at least one of the signal intensity difference and the distance.

The segmenting unit 240 may detect a path in which the sum of weights is minimum, among the paths between the start node and the end node connected through the respective links (the start link, the voxel link, and the end link). Hereinafter, the path in which the sum of weights is minimum will be referred to as a shortest path. In the process of detecting the path, the segmenting unit 240 may regard the link with a weight of a certain size or less as being cut and may detect the shortest path. In the above example, the link assigned the minimum value (e.g., the link connected with the voxel node of the second seed group among the start links) may be regarded as being cut.

When the shortest path is detected, the segmenting unit 240 may determine the link having the smallest weight in the detected shortest path as a cut link to be excluded in the subsequent path detection. For example, the segmenting unit 240 may change the weight of the link having the smallest weight in the shortest path into the minimum value and may treat the same as being cut in the path detection.

Figure 9:
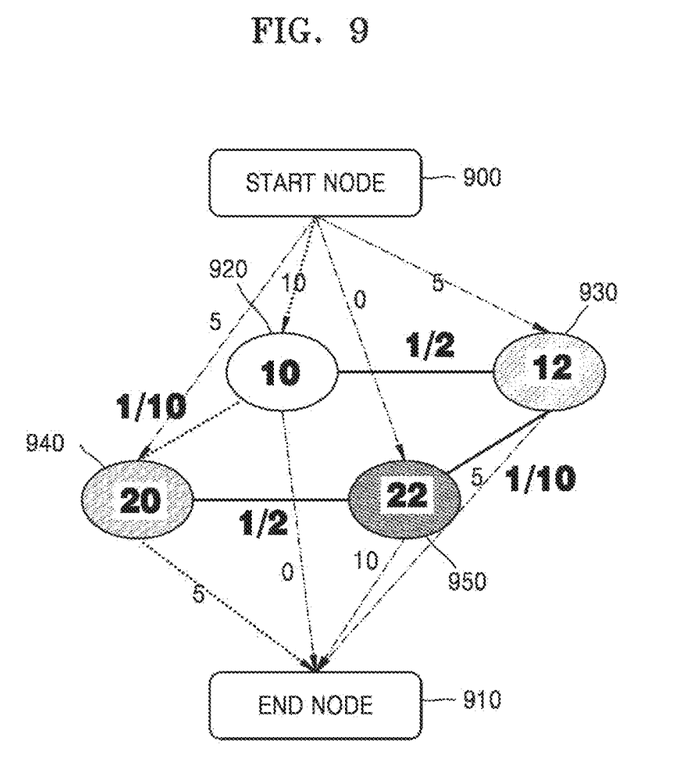
FIG. 9 is a diagram briefly illustrating an example of a medical image segmenting method according to the inventive concept.
Figure 11:
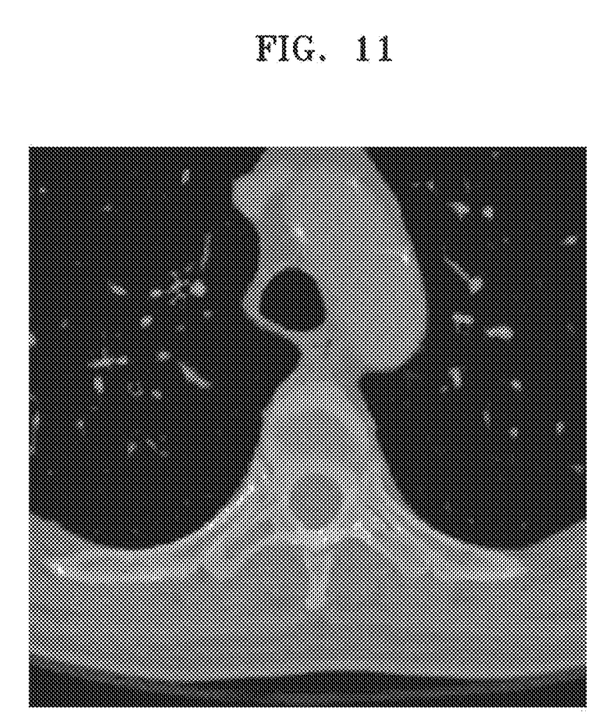
FIGS. 11 and 12 are diagrams illustrating a region segmentation result in a medical image according to an embodiment of the inventive concept.
Figure 12:
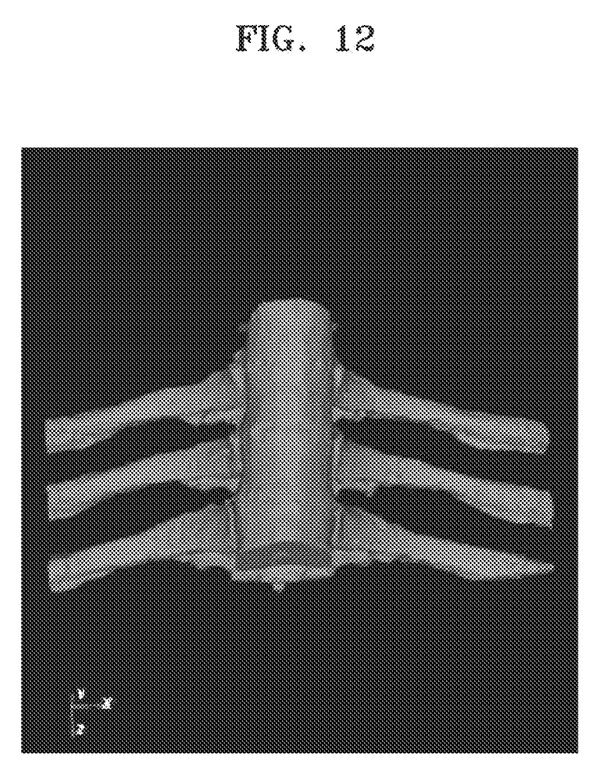

The segmenting unit 240 may repeat a process of detecting the shortest path and determining the cut link until the voxel nodes are segmented into two regions when the link is cut along the cut link. A simple example of a voxel link segmenting process is illustrated in FIG. 9. An example of a body organ segmented from the medical image by the segmenting unit 240 is illustrated in FIGS. 11 and 12.

FIGS. 3 to 5 are diagrams illustrating an example of a method of receiving a seed group from the user for medical image segmentation according to the inventive concept.

Referring to FIGS. 3 to 5, a region segmenting apparatus may receive a selection of one or more voxels belonging to a segmentation target region 320, 420, or 520 and one or more voxels belonging to a remaining region thereof from the user through an X-Y plane image 300, 400, or 500 of the medical image. The region segmenting apparatus may set the voxel of each region 340, 350, 440, or 540 selected by the user as a first seed group for the segmentation target region 320, 420, or 520 or a second seed group for the remaining region. The remaining region other than the segmentation target region 320, 420, or 520 in the medical image 300, 400, or 500 may include one or more regions.

For example, when receiving a selection of a region of a line 340 or 350, a polygon 440, or a random shape 540 from the user, the region segmenting apparatus may set the voxel corresponding to the line 340 or 350, the polygon 440, or the random shape 540 as the seed group.

FIG. 6 is a diagram illustrating an example of a method of setting a seed group based on a region growing method for medical image segmentation according to the inventive concept.

Referring to FIG. 6, the region segmenting apparatus may set a first seed group or a second seed group by using a region growing method of expanding a space having a certain volume to a surrounding region having a similar signal intensity from one voxel (hereinafter referred to as a reference point) belonging to a segmentation target region 620 or a remaining region thereof among the voxels constituting a medical image 600. In the case of using the region growing method, since a seed group including the voxels in a volume is set instead of forming a seed group including the voxels belonging to a X-Y plane of the medical image, a seed group for more accurate region segmentation may be secured.

A reference point for application of the region growing method may be received from the user in the medical image cross section illustrated in FIG. 3 or may be automatically set based on a predetermined position with respect to a segmentation target region of the medical image. For example, in the process of capturing a lung image, when a lung is located at the center of the medical image, the voxel representing the signal intensity of the lung at the center of the medical image may be automatically set as the reference point. In addition, various other reference point setting methods may be applied.

Based on the reference point, the region segmenting apparatus may expand the region by connecting the voxels satisfying the range of an upper limit value and a lower limit value of the signal intensity of the corresponding tissue. Herein, the upper limit value and the lower limit value may be determined according to the type of the body organ. For example, in the case of segmenting a lung region in a CT image, the region segmenting apparatus may expand a region having a volume from the reference point in the lung region by connecting the voxels having a signal intensity within a certain error range with respect to a signal intensity of −400 HU.

According to an embodiment, the region segmenting apparatus may set a first seed group for the segmentation target region through the region growing method and may set a second seed group for the remaining region through the line received from the user. A certain region (e.g., a lung) may be segmented in the medical image through the region growing method; however, the segmentation result of the region growing method may be rough due to various noises in the medical image and it may be difficult to obtain an accurate boundary of the segmentation target region.

The seed group setting method is not limited to the above embodiments. For example, in other embodiments, a first seed group or a second seed group may be set based on the signal intensity difference between the voxels, or a seed group for two rough regions may be set by using various conventional image processing algorithms.

FIG. 7 is a diagram illustrating an example of a method of setting a seed group based on a morphological feature for medical image segmentation according to the inventive concept.

Referring to FIG. 7, the region segmenting apparatus may determine a region of a sheet, line, or blob shape based on the directivity with respect to a change in the signal intensity of the voxel and then may set a voxel belonging to the region as a first seed group or a second seed group.

The directivity with respect to a change in the signal intensity of the voxel may be determined through an eigenvector and an eigenvalue. For example, since a bronchus has a round tube shape, the directivity of the signal intensity of the bronchus may be represented by a vector having a certain direction.

The eigenvector and the eigenvalue may be obtained through a Hessian matrix. The relationship of each voxel of a 3D image with a surrounding voxel may be represented by a Hessian matrix as follows.

$$\begin{bmatrix} \frac{\partial^2 I}{\partial x^2} & \frac{\partial^2 I}{\partial x \partial y} & \frac{\partial^2 I}{\partial x \partial z} \\ \frac{\partial^2 I}{\partial y \partial x} & \frac{\partial^2 I}{\partial y^2} & \frac{\partial^2 I}{\partial y \partial z} \\ \frac{\partial^2 I}{\partial z \partial x} & \frac{\partial^2 I}{\partial z \partial y} & \frac{\partial^2 I}{\partial z^1} \end{bmatrix}$$ Equation 1

Herein, 'I' denotes the signal intensity at (x,y,z) coordinates.

The eigenvector and the eigenvalue may be obtained through a process of regarding each element of the Hessian matrix as a coefficient of a third-order simultaneous equation and obtaining the solution of the equation.

The region segmenting apparatus may have a predetermined eigenvector and eigenvalue representing the structural feature of each body tissue. For example, when the eigenvalues for x, y, and z axes are respectively $\lambda_1$, $\lambda_2$, and $\lambda_3$, it may have the following characteristics.

TABLE 1

| Structural Features | Eigenvalue Conditions |
| --- | --- |
| Sheet | $\lambda_3 \ll \lambda_2 \cong \lambda_1 \cong 0$ |
| Line | $\lambda_3 \cong \lambda_2 \ll \lambda_1 \cong 0$ |
| Blob | $\lambda_3 \cong \lambda_2 \cong \lambda_1 \ll 0$ |

For example, a bronchus may have a line structure of a typical tube shape, and the range of an eigenvalue for specifying the line structure of a bronchus may be pre-examined and defined as follows.

$$\lambda_1 < 70 \text{ and } \lambda_2 > 70 \text{ and } \lambda_3 > 70$$ Equation 2

The region segmenting apparatus may compare an eigenvector and an eigenvalue for a human body tissue extracted from a 3D medical image with a reference eigenvector and a reference eigenvalue predetermined for a tissue to be extracted, may extract voxels satisfying a certain condition, and may set a first seed group and a second seed group. For example, when a segmentation target region is a lung region, the region segmenting apparatus may extract a region and set a voxel of the region as a first seed group through a process of obtaining an eigenvector and an eigenvalue for a change in the signal intensity of the voxels belonging to a lung and then determining whether the range of an eigenvalue for each direction satisfies Equation 2.

FIG. 8 is a diagram illustrating an example of a node graph for medical image segmentation according to the inventive concept.

Referring to FIG. 8, a node graph 800 used for region segmentation may include a virtual start node 810, a virtual end node 820, and a voxel node 830 that is one-to-one mapped to each voxel. For convenience of description, the present embodiment illustrates only 27 voxels.

The node graph 800 may include a start link 840 connecting the start node 810 and each voxel node 830, an end link 850 connecting the end node 820 and each voxel node 830, and a voxel link 860 connecting the voxel nodes 830 with each other. For simplicity of illustration, the present embodiment does not illustrate a diagonally-connected voxel link.

The region segmenting apparatus may assign a weight to each of the start link 840, the end link 850, and the voxel link 860.

The start link 840 may be divided into a link connecting the start node 810 with the voxel node belonging to the first seed group, a link connecting the start node 810 with the voxel node belonging to the second seed group, or a link connecting the start node 810 with the other voxel node. The region segmenting apparatus may assign predetermined different weights to the respective links.

The end link 850 may be divided into a link connecting the end node 820 with the voxel node belonging to the first seed group, a link connecting the end node 820 with the voxel node belonging to the second seed group, or a link connecting the end node 820 with the other voxel node. The region segmenting apparatus may assign predetermined different weights to the respective links.

The voxel link 860 may be a link connecting adjacent voxel nodes with each other. The distances between the respective voxels may be different according to the medical images. For example, the voxel node 832 located in the space may have 26 voxel links because it is connected with 26 adjacent voxel nodes 830. In the present embodiment, the distances between the respective voxels of the x and y axes may be equal to each other, but the distance between the voxels of the z axis may be longer than the distance between the voxels of the x and y axes. According to an embodiment, all of the distances between the voxels of the x, y, and z axes may be equal to each other. The region segmenting apparatus may determine the weight of the voxel link based on the distance and the signal intensity difference between the adjacent voxels. When the distances between the voxels are uniform in all directions, the region segmenting apparatus may determine the weight of the voxel link by using only the signal intensity difference.

FIG. 9 is a diagram briefly illustrating an example of a medical image segmenting method according to the inventive concept.

Referring to FIG. 9, a medical image may include four voxel nodes 920, 930, 940, and 950, and a maximum value and a minimum value of the weight predetermined for a start node 900 and an end node 910 may be 10 and 0 respectively. Also, the first voxel node 920 may belong to the first seed group, and the fourth voxel node 950 may belong to the second seed group.

The region segmenting apparatus may determine the weight of the start link connecting the start node 900 and each of the voxel nodes 920, 930, 940, and 950. Since the first voxel node 920 belongs to the first seed group and the fourth voxel node 950 belongs to the second seed group, the region segmenting apparatus may assign a weight '10' to the start link between the start node and the first voxel node and may assign a weight '0' to the start link between the start node and the fourth voxel node. Also, the region segmenting apparatus may assign a medium value '5' between the maximum value and the minimum value (=(Maximum Value−Minimum Value)/2) as a weight to the start links between the start node and the second and third voxel nodes 930 and 940 not belonging to the first seed group and the second seed group. In the same way, the region segmenting apparatus may assign a weight to the end link between the end node 910 and each of the voxel nodes 920, 930, 940, and 950.

The region segmenting apparatus may determine the weight of the voxel link based on the distance and the signal intensity difference between the voxels. In the present embodiment, a diagonally-connected voxel link is omitted for simplicity of description, and it is assumed that the distances between the respective voxels are all equal to '1'. The region segmenting apparatus may determine a weight of the voxel link as a value of 1/(Signal Intensity Difference× Distance).

For example, since the signal intensity of the first voxel node 920 is '10' and the signal intensity of the second voxel node 930 is '12', the region segmenting apparatus may assign a weight '1/2' (=1/(12−10)) to the voxel link between two voxel nodes 920 and 930. In the same manner, a weight of each voxel link may be determined.

When the setting of the weights of all links is completed, the region segmenting apparatus may detect the path having the minimum weight among the paths connecting the start node 900 and the end node 910. In the present embodiment, since the sum of the weights of a path of the start node 900–the first voxel node 920–the third voxel node 940–the end node 910 is smallest as 15.1 (=10+1/10+5), the region segmenting apparatus may select the path as a first shortest path. Also, since the weight (1/10) of a voxel link connecting the first voxel node 920 and the third voxel node 940 is smallest in the first shortest path, the region segmenting apparatus may determine the voxel link as a first cut link.

Since the voxel node is not segmented into two parts only by the first cut link, the region segmenting apparatus may again detect another shortest path in which the sum of weights is minimum, with exclusion of the previous first shortest path. Since the sum of the weights of a path of the start node 900–the second voxel node 930–the fourth voxel node 950–the end node 910 is minimum with exclusion of the first shortest path, the region segmenting apparatus may select the path as a second shortest path and may determine a voxel link connecting the second voxel node 930 with the fourth voxel node 950, in which the weight is minimum in the second shortest path, as a second cut link.

When the first cut link and the second cut link are cut, the voxel node may be segmented into two parts in the node graph 800. That is, the region segmenting apparatus may extract a segmentation target region from the medical image based on the cut node.

Figure 10:
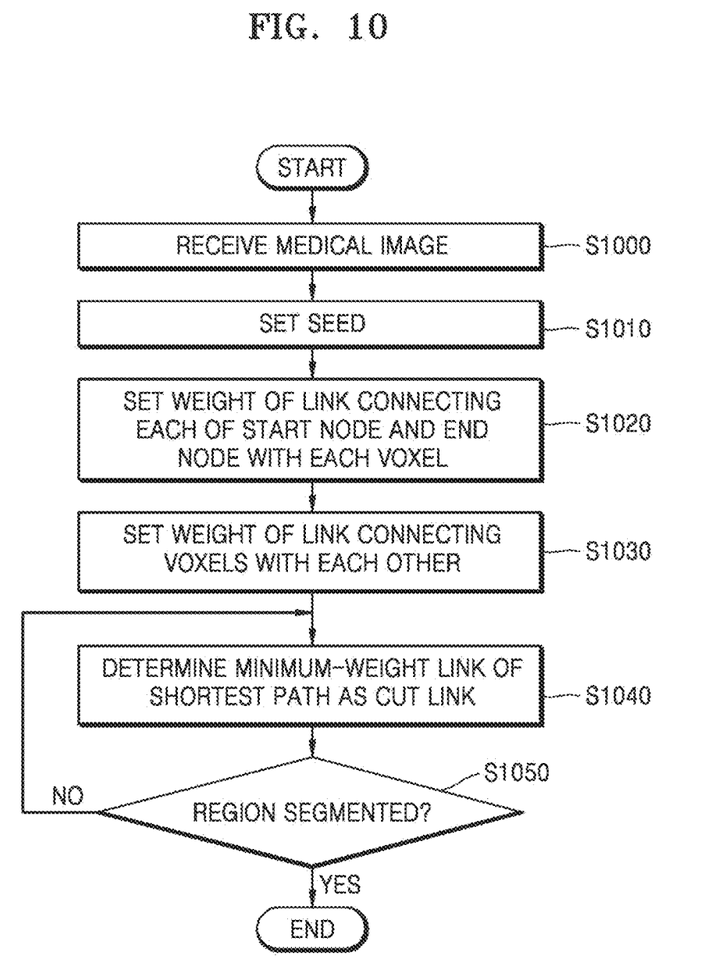
FIG. 10 is a diagram illustrating a flow of an embodiment of a medical image segmenting method according to the inventive concept.

FIG. 10 is a diagram illustrating a flow of an embodiment of a medical image segmenting method according to the inventive concept.

Referring to FIG. 10, the region segmenting apparatus may receive a 3D medical image including voxels (S1000). Through various methods, the region segmenting apparatus may set a first seed group including one or more voxels belonging to a segmentation target region and a second seed group including one or more voxels belonging to a remaining region thereof (S1010).

The region segmenting apparatus may assign a weight to a start link connecting each of a virtual start node and a virtual end node with a voxel node representing each voxel (S1020). The region segmenting apparatus may assign predetermined different weights to the respective start links based on whether the voxel node is connected to the start node or to the end node and whether the voxel node belongs to the first seed group or to the second seed group.

Also, the region segmenting apparatus may determine a weight of a voxel link connecting the voxel nodes with each other (S1030). For example, the region segmenting apparatus may set a weight of the voxel link based on the signal intensity difference between adjacent voxels. Since the distances between the respective voxels may be different according to the axial directions, the region segmenting apparatus may set a weight of the voxel link in consideration of both the distance and the signal intensity difference.

When the setting of the weights of the respective links is completed, the region segmenting apparatus may detect a shortest path in which the sum of weights is minimum among the paths connecting the start node and the end node and may determine a link having a minimum weight in the shortest path as a cut link (S1040). The region segmenting apparatus may repeat a process of determining the cut link (S1040) until the voxel node is segmented into two regions when the cut link is cut (S1050).

The inventive concept may also be embodied as computer-readable codes on a computer-readable recording medium. The computer-readable recording medium may be any data storage device that may store data which may be thereafter read by a computer system. Examples of the computer-readable recording medium may include read-only memories (ROMs), random-access memories (RAMs), compact disk read-only memories (CD-ROMs), magnetic tapes, floppy disks, and optical data storage devices. The computer-readable recording medium may also be distributed over network-coupled computer systems so that the computer-readable codes may be stored and executed in a distributed fashion.

According to the inventive concept, regions of living organs may be segmented accurately in units of voxels in 3D medical images. Regions of medical images may be segmented more accurately through seed groups of voxels set by using the similarity in the signal intensity of voxels, the directivity with respect to a change in the signal intensity, or the like. Regions of medical images may be segmented accurately even when the distances between voxels are not uniform in 3D medical images.

The inventive concept has been particularly shown and described with reference to the exemplary embodiments thereof. However, those of ordinary skill in the art will understand that various changes in form and details may be made therein without departing from the spirit and scope of the inventive concept as defined by the appended claims. Thus, the above embodiments should be considered in descriptive sense only and not for purposes of limitation. Therefore, the scope of the inventive concept may be defined not by the above detailed descriptions but by the appended claims, and all differences within the scope will be construed as being included in the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of segmenting medical images, the method comprising:
    receiving a medical image;
    setting a first seed group comprising voxels belonging to a segmentation target region among voxels of the medical image and a second seed group comprising voxels belonging to a remaining region thereof;
    assigning a weight to a link connecting each of a start node and an end node with a voxel node representing each voxel of the medical image, wherein the weight is determined based on a type of a node connected with the voxel node and a type of a seed group to which the voxel node belongs;
    determining a weight of a link connecting voxel nodes with each other based on at least one of a distance and a signal intensity difference between voxels of the medical image; and
    repeating a process of determining a link having a minimum weight in a shortest path, in which a sum of weights of a path connecting the start node and the end node is minimum, as a cut link until voxel nodes of the medical image are segmented into two regions by a cut link,
    wherein the repeating of the process of determining the link as the cut link comprises determining a shortest path connecting the start node and the end node with each other with exclusion of a link connecting the start node and a voxel node of the second seed group, a link connecting the end node and a voxel node of the first seed group, and a link determined as a cut link.

2. The method of claim 1, wherein the setting of the first seed group and the second seed group comprises:
    displaying the medical image on a screen;
    receiving a selection of a point, line, or sheet through the screen from a user; and
    setting a voxel corresponding to the point, line, or sheet as the first seed group or the second seed group.

3. The method of claim 1, wherein the setting of the first seed group and the second seed group comprises setting a voxel belonging to a region expanded from a reference point based on an upper limit value of a signal intensity of a predetermined voxel in the medical image as the first seed group or the second seed group.

4. The method of claim 1, wherein the setting of the first seed group and the second seed group comprises setting a voxel belonging to a sheet, line, or blob region determined based on a directivity with respect to a change in each direction of a signal intensity of voxels in the medical image as the first seed group or the second seed group.

5. A method of segmenting medical images, the method comprising:
    receiving a medical image;
    setting a first seed group comprising voxels belonging to a segmentation target region among voxels of the medical image and a second seed group comprising voxels belonging to a remaining region thereof;
    assigning a weight to a link connecting each of a start node and an end node with a voxel node representing each voxel of the medical image, wherein the weight is determined based on a type of a node connected with the voxel node and a type of a seed group to which the voxel node belongs;
    determining a weight of a link connecting voxel nodes with each other based on at least one of a distance and a signal intensity difference between voxels of the medical image; and
    repeating a process of determining a link having a minimum weight in a shortest path, in which a sum of weights of a path connecting the start node and the end node is minimum, as a cut link until voxel nodes of the medical image are segmented into two regions by a cut link, wherein as for a first weight of a link connecting the start node and a voxel node of the first seed group, a second weight of a link connecting the start node and a voxel node of the second seed group, and a third weight of a link connecting the start node and a voxel node belonging to neither the first seed group nor the second seed groups, a relationship of the first weight>the third weight>the second weight is satisfied.

6. A method of segmenting medical images, the method comprising:
    receiving a medical image;
    setting a first seed group comprising voxels belonging to a segmentation target region among voxels of the medical image and a second seed group comprising voxels belonging to a remaining region thereof;
    assigning a weight to a link connecting each of a start node and an end node with a voxel node representing each voxel of the medical image, wherein the weight is determined based on a type of a node connected with the voxel node and a type of a seed group to which the voxel node belongs;

determining a weight of a link connecting voxel nodes with each other based on at least one of a distance and a signal intensity difference between voxels of the medical image; and repeating a process of determining a link having a minimum weight in a shortest path, in which a sum of weights of a path connecting the start node and the end node is minimum, as a cut link until voxel nodes of the medical image are segmented into two regions by a cut link, wherein as for a first weight of a link connecting the end node and a voxel node of the first seed group, a second weight of a link connecting the end node and a voxel node of the second seed group, and a third weight of a link connecting the end node and a voxel node belonging to neither the first seed group and the second seed groups, a relationship of the first weight<the third weight<the second weight is satisfied.

7. An apparatus for segmenting medical images, the apparatus comprising:

an input unit receiving a medical image;

a group setting unit setting a first seed group comprising voxels belonging to a segmentation target region among voxels of the medical image and a second seed group comprising voxels belonging to a remaining region thereof;

a first weight determining unit assigning a weight to a link connecting each of a start node and an end node with a voxel node representing each voxel of the medical image, wherein the weight is determined based on a type of a node connected with the voxel node and a type of a seed group to which the voxel node belongs;

a second weight determining unit determining a weight of a link connecting voxel nodes with each other based on at least one of a distance and a signal intensity difference between voxels of the medical image; and a segmenting unit repeating a process of determining a link having a minimum weight in a shortest path, in which a sum of weights of a path connecting the start node and the end node is minimum, as a cut link until voxel nodes of the medical image are segmented into two regions by a cut link;

wherein the segmenting unit determining a shortest path connecting the start node and the end node with each other with exclusion of a link connecting the start node and a voxel node of the second seed group, a link connecting the end node and a voxel node of the first seed group, and a link determined as a cut link.

8. A non-transitory computer-readable recording medium that stores a program for performing the method of claim 1.

* * * * *